(12) United States Patent
Runkle (10) Patent No.: US 8,487,557 B2
(45) Date of Patent: Jul. 16, 2013

(54) USE OF MOTOR PROTECTION SYSTEM TO PROTECT PROCESS OPERATION

(75) Inventor: Mark Andrew Runkle, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 368 days.

(21) Appl. No.: 13/027,837

(22) Filed: Feb. 15, 2011

(65) Prior Publication Data

US 2012/0207617 A1    Aug. 16, 2012

(51) Int. Cl.
*H02P 1/54* (2006.01)
(52) U.S. Cl.
USPC .................. 318/34; 318/51; 318/484
(58) Field of Classification Search
USPC .............. 318/34, 51, 484, 436, 424; 388/820, 388/921; 417/1; 361/30
See application file for complete search history.

(56) References Cited

U.S. PATENT DOCUMENTS 5,572,879 A * 11/1996 Harrington et al. ............. 62/217

OTHER PUBLICATIONS

GE Multilin, "469 Motor Management Relay Instruction Manual", Copyright 2008 GE Multilin, 248 pages, 469 Firmware Revision 30E29x.000, 469 PC Software Revision 2.9X, Manual P/N: 1601-0057-DH (GEK-106289J), Canada.
GE Multilin, "469 Motor Management Relay Instruction Manual", Copyright 2009 GE Multilin, 338 pages, Software Revision 5.0x, Manual P/N: 1601-0122-A8 (GEK-106474G), http://www.gedigitalenergy.com/products/manuals/469/469man-a8.pdf on Mar. 30, 2010, Canada.
ABB, "Low Voltage Products: Motor Protection Relay, SPEM", 2006, pp. 1-12, retrieved from: http://www.05.abb.com/global/scot/scot209.nsf/veritydisplay/97ce945af02da944c1256c550026966f/$File/SPEM1GB01_06.pdf on Mar. 30, 2010, Finland.
GE, "Industry Leading Protection & Control: Ensuring the integrity of the world's power systems", 3 pages, retrieved from: http://www.gedigitalenergy.com/protection_control.htm on Mar. 30, 2010.
GE Multilin, "Motor Protection Principles", p. 1, Copyright 2010, retrieved from: http://www.gedigitalenergy.com/multilin/family/motors/principles.htm on Mar. 30, 2010.
GE Multilin, "Motor Protection Principles", p. 2, Copyright 2010, retrieved from: http://www.gedigitalenergy.com/multilin/family/motors/principles2.htm on Mar. 30, 2010.

(Continued)

*Primary Examiner* — Karen Masih
(74) *Attorney, Agent, or Firm* — Hoffman Warnick LLC; Ernest G. Cusick (57) ABSTRACT

Disclosed herein is an approach that uses a motor protection system to protect a process operation. In one aspect, a motor protection system in conjunction with a controller monitor the performance of redundant motor-driven prime movers having a lead motor-driven prime mover and a lag motor-driven prime mover. In one embodiment, the controller controls operation of the redundant motor-driven prime movers as a function of motor protection measurements generated from the motor protection system. In particular, the controller uses the motor protection measurements to determine if the lead motor-driven prime mover is in distress. The controller activates operation of the lag motor-driven prime mover in response to determining that the lead motor-driven prime mover is in distress. In one embodiment, the controller activates operation of the lag motor-driven prime mover prior to tripping the distressed lead motor-driven prime mover.

20 Claims, 4 Drawing Sheets

100

OTHER PUBLICATIONS

GE Multilin, "Motor Protection Principles", p. 3, Copyright 2010, retrieved from: http://www.gedigitalenergy.com/multilin/family/motors/principles3.htm on Mar. 30, 2010.

GE Multilin, "Motor Protection Principles", p. 4, Copyright 2010, retrieved from: http://www.gedigitalenergy.com/multilin/family/motors/principles4.htm on Mar. 30, 2010.

Venkataraman et al., "Fundamentals of a Motor Thermal Model and its Applications in Motor Protection", pp. 41-55, Date Unknown, retrieved from: http://www.geindustrial.com/pm/family/motors/Motor_Thermal_Model.pdf on Mar. 30, 2010.

SQUARE D: Product Data Bulletin, "Developments in Motor Protection: White Paper", pp. 1-12, Jan. 1996, Bulletin No. 9065PD9501, retrieved from: http://ecatalog.squared.com/techlib/docdetail.cfm?oid=0900892680079307 on Mar. 30, 2010, North Carolina.

* cited by examiner

USE OF MOTOR PROTECTION SYSTEM TO PROTECT PROCESS OPERATION

BACKGROUND OF THE INVENTION

The present invention relates generally to motor protection systems and more particularly to using motor protection measurements generated from a motor protection system to monitor a process operation.

Often, a process operation is monitored by controlling any of those varying operational and physical conditions associated with the process. These varying operational and physical conditions are referred to as process variables. Examples of process variables of a process operation can include temperature, speed, pressure, flow rate, etc. Typically, the control strategy of a process operation centers on the monitoring and controlling of these process variables with respect to limits specified for these variables. The operational conditions of the specific assets or machinery used in the process are usually not considered in the control strategy of the process operation.

BRIEF DESCRIPTION OF THE INVENTION

In one aspect of the present invention, a system is provided. The system comprises at least two redundant motor-driven prime movers. One of the at least two redundant motor-driven prime movers comprises a lead motor-driven prime mover and a second of the at least two redundant motor-driven prime movers comprises a lag motor-driven prime mover that operates in response to the lead motor-driven prime mover being in distress. A plurality of sensors, coupled to the at least two redundant motor-driven prime movers, measure operational data associated with the at least two redundant motor-driven prime movers. A motor protection system, coupled to the plurality of sensors, generates a plurality of motor protection measurements from the operational data measured by the plurality of sensors. A controller, coupled to the at least two redundant motor-driven prime movers and the motor protection system, controls operation of the at least two redundant motor-driven prime movers as a function of the plurality of motor protection measurements. The controller uses the plurality of motor protection measurements to determine if the lead motor-driven prime mover is in distress. The controller activates operation of the lag motor-driven prime mover in response to determining that the lead motor-driven prime mover is in distress. The controller activates operation of the lag motor-driven prime mover prior to tripping the distressed lead motor-driven prime mover.

In another aspect of the present invention, a prime mover system that moves a fluid is disclosed. The prime mover system comprises a lead prime mover driven by a first motor that moves the fluid. A lag prime mover driven by a second motor moves the fluid in response to the first motor being in distress. A plurality of sensors measure operational data associated with the first motor of the lead prime mover and the second motor of the lag prime mover. A first motor protection system generates a plurality of motor protection measurements from the operational data associated with the first motor and a second motor protection system generates a plurality of motor protection measurements from the operational data associated with the second motor. A controller controls operation of the lead prime mover and the lag prime mover as a function of the plurality of motor protection measurements generated by the first motor protection system and the second motor protection system. The controller uses the plurality of motor protection measurements to determine if the lead prime mover is in distress. The controller activates operation of the lag prime mover in response to determining that the lead prime mover is in distress. The controller activates operation of the lag prime mover prior to tripping the distressed lead prime mover. The controller utilizes a motor protection curve defined for a process in which the lead prime mover and lag prime mover are used to guide operation of the prime movers. The motor protection curve provides a safe run-time for operating the distressed lead prime mover at an overload current level and a maximum backup starting time for activating operation of the lag prime mover prior to the tripping of the distressed lead prime mover.

DETAILED DESCRIPTION OF THE INVENTION

Various embodiments of the present invention are directed to monitoring a process operation using motor protection measurements generated from a motor protection system that is used to protect industrial motors operating in the process. Embodiments of the present invention are suited for use with redundant motor-driven prime movers in which there is a lead motor-driven prime mover and a lag motor-driven prime mover that operates in response to the lead motor-driven prime mover being in distress. In one embodiment, sensors measure operational data associated with the lead motor-driven prime mover and the lag motor-driven prime mover. The motor protection system generates the motor protection measurements from the operational data measured by the sensors. In one embodiment, the operational data obtained from the motors includes current and average phase current and the motor protection measurements includes current unbalance and current overload. A controller uses the motor protection measurements to control operation of the lead motor-driven prime mover and lag motor-driven prime mover. In particular, the controller uses the motor protection measurements to determine if the lead motor-driven prime mover is in distress. In one embodiment, the controller utilizes a motor protection curve defined for the process operation in which the lead motor-driven prime mover and lag motor-driven prime mover operate to determine if the lead motor-driven prime mover is in distress. In one embodiment, the motor protection curve provides a safe run-time for operating the distressed lead motor-driven prime mover at an overload current level. In addition, the motor protection curve provides a maximum backup starting time for activating operation of the lag motor-driven prime mover prior to the tripping of the distressed lead motor-driven prime mover. If the controller determines that the lead motor-driven prime mover is in distress, then it activates operation of the lag motor-driven prime mover prior to the tripping of the distressed lead motor-driven prime mover.

Technical effects of the various embodiments of the present invention include improving monitoring and controlling of a process operation by using motor protection measurements generated from a motor protection system that operates in conjunction with motor-driven assets or machinery as opposed to solely relying on process variables to control the process. This enables changes to be made to the motor-driven assets or machinery to control the process operation. As a result, changes to the process operation occur sooner than if one was to wait for the process variables to approach a low or high limit before implementing a change to the process. Other technical effects of the various embodiments of the present invention include changing the use of a motor protection system from only functioning to protect a motor to having a role in protecting the reliability and availability of a process operation.

Figure 1:
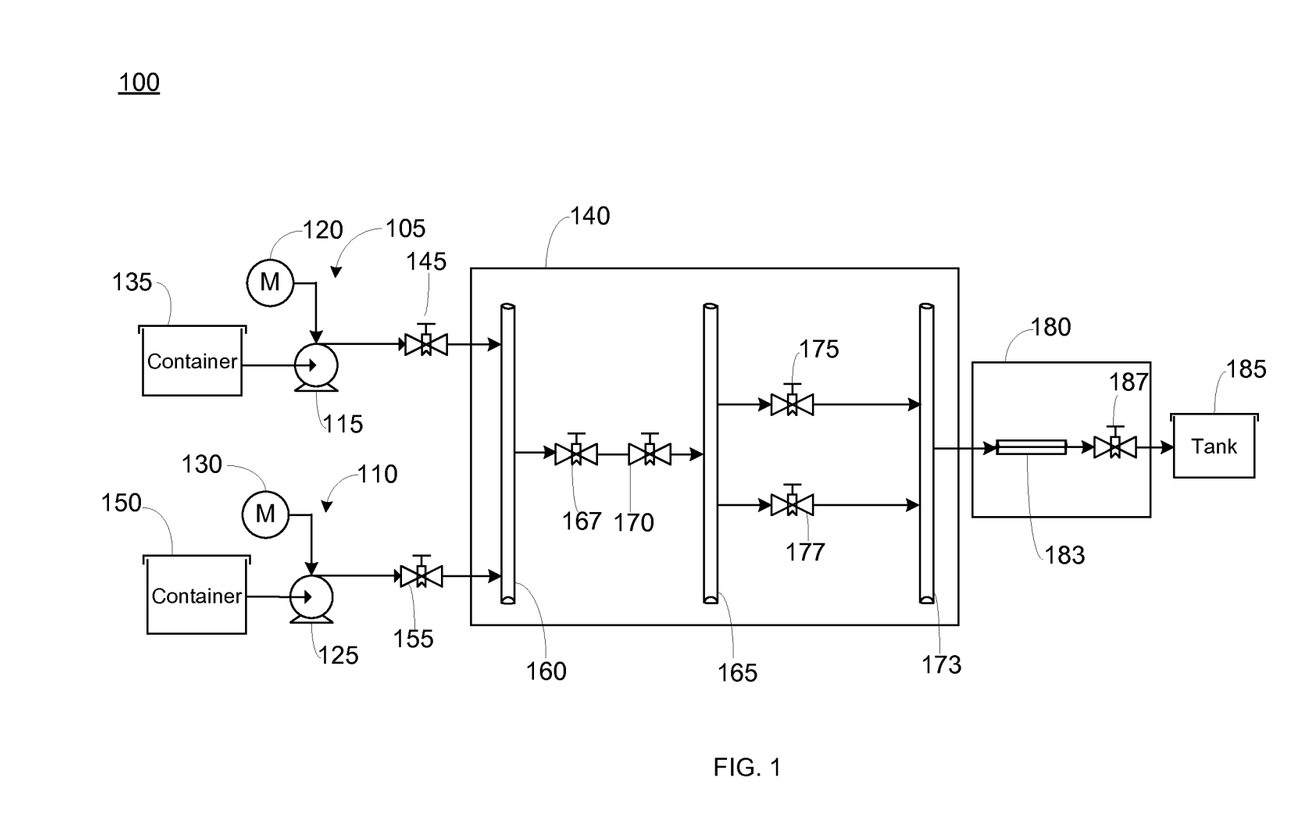
FIG. 1 is a schematic diagram illustrating a process operation in which embodiments of the present invention may be implemented.

FIG. 1 is a schematic diagram illustrating an example of a process operation 100 utilizing redundant motor-driven prime movers 105 and 110 in which embodiments of the present invention may be implemented. In this example, redundant motor-driven prime movers 105 and 110 are used to move a fluid in a steam lube oil tank. Although the various embodiments of the present invention are described with respect to the use of redundant motor-driven prime movers in a steam lube oil tank, those skilled in the art will recognize that the embodiments described herein are suitable for use in any process operation in which redundant motor-driven prime movers can be used. Other examples in which redundant motor-driven prime movers are utilized include process or safety critical ventilation systems using centrifugal fans and fuel-forwarding pumps using centrifugal pumps.

Referring back to FIG. 1, prime mover 105 is the lead prime mover because it is the primary mover of fluid, while prime mover 110 is the lag prime mover because it serves as a backup mover of the fluid when the lead prime mover is not operating properly (e.g., in distress). Those skilled in the art will recognize that commercial and industrial systems commonly provide at least one backup fluid prime mover for functions deemed critical to a process, however, for ease of illustrating an application for use of the embodiments of the present invention, only one lead prime mover and one lag prime mover are illustrated in FIG. 1. As shown in FIG. 1, lead prime mover 105 comprises a pump 115 driven by a motor 120, while lag prime mover 110 comprises a pump 125 driven by a motor 130. In one embodiment, motors 120 and 130 are industrial motors that can take the form of induction motors. In this example, lead prime mover 105 and lag prime mover 110 are configured to move lubrication oil. As shown in FIG. 1, lead prime mover 105 moves lubrication oil from an oil container 135 to a steam lube oil tank 140 via a valve 145. Lag prime mover 110 is configured to move lubrication oil from an oil container 150 to steam lube oil tank 140 via a valve 155. The lubrication oil supplied by lead prime mover 105 and lag prime mover 110 is fed into a header of a common supply manifold 160 of steam lube oil tank 140. Supply manifold 160 is coupled to a header of an intermediate manifold 165 via valves 167 and 170. A header of an outlet manifold 173 is coupled to intermediate manifold 165 via valves 175 and 177. As shown in FIG. 1, lube oil is provided from steam lube oil tank 140 to bearings unit 180 for lubrication. In particular, piping 183 within bearings unit 180 receives the lubrication oil from steam lube oil tank 140 and provides it to the various bearing orifices. The lubrication oil is then sent to a lube oil tank 185 via a valve 187. Those skilled in the art will appreciate that oil containers 135 and 150 and lube oil tank 185 may all be the same vessel.

A conventional approach to monitoring and controlling the movement of the lubrication oil to and from steam lube oil tank 140 via lead prime mover 105 and lag prime mover 110 relies on controlling certain process variables. In such a scenario, process instruments such as sensors are located about the process operation to obtain data pertinent to the process variable. If the data pertaining to these process variables is found to be in an unacceptable range of operation, then certain changes are made to the process operation in order to direct the process towards an acceptable operating range. In one example, a pressure sensor could be placed about the header of outlet manifold 173 to obtain pressure measurements to assure that the lubrication oil is available to bearings unit 180. If the pressure at the header of outlet manifold 173 is at an unacceptable range, then a controller may start lag prime mover 110 (i.e., pump 125 and motor 130) to provide more lubrication. In another scenario, a pressure sensor could be placed about valve 170 to generate differential pressure measurements. If the differential pressure measurements about valve 170 are low and in an unacceptable range, then this could be an indication that there is a clogged filter and that it would warrant activating operation of lag prime mover 110 in order to have that pressure reading move up to a desired nominal range. In either example, it is desirable to not lose fluid pressure at bearings unit 180. However, it matters what is done with the running pump 115 when the backup pump 125 is started. Since there is no pressurized storage or accumulators utilized in FIG. 1, it is necessary to wait until the backup pump 125 is running to shut down pump 115 from the distressed lead prime mover 105.

Embodiments of the present invention are directed to using operational data from motors 120 and 130 to control process operation 100. Although not shown in FIG. 1, industrial motors such as motors 120 and 130 typically are deployed with motor protection systems (e.g., motor relays, meters, motor control centers, etc.) to protect the motors from failing. In particular, these motor protection systems generally provide protection against unbalanced loads, excessively high overcurrent faults, undervoltage conditions, overvoltage conditions, mechanical jams and load losses. In addition, these motor protection systems generate data that relates to the conditions of other loads that share the electrical buses of the motors that are protected by the motor protection systems.

With regard to using operational data from motors 120 and 130 to control process operation 100, embodiments are specifically directed to using motor protection measurements generated from the motor protection system(s) to control the process. The intent is to utilize information previously unavailable for motors to make a better process decision and to act sooner than if control was based on certain process variables being in or approaching unacceptable operating ranges. The control action provided by the various embodiments of the present invention is preemptive and results in never perturbing the key process variables to approach its low or high limits. In one embodiment, the motor protection measurements can be used solely to control the process operation or used in conjunction with a control strategy that involves maintaining the designated process variables within an acceptable range of operation.

Figure 2:
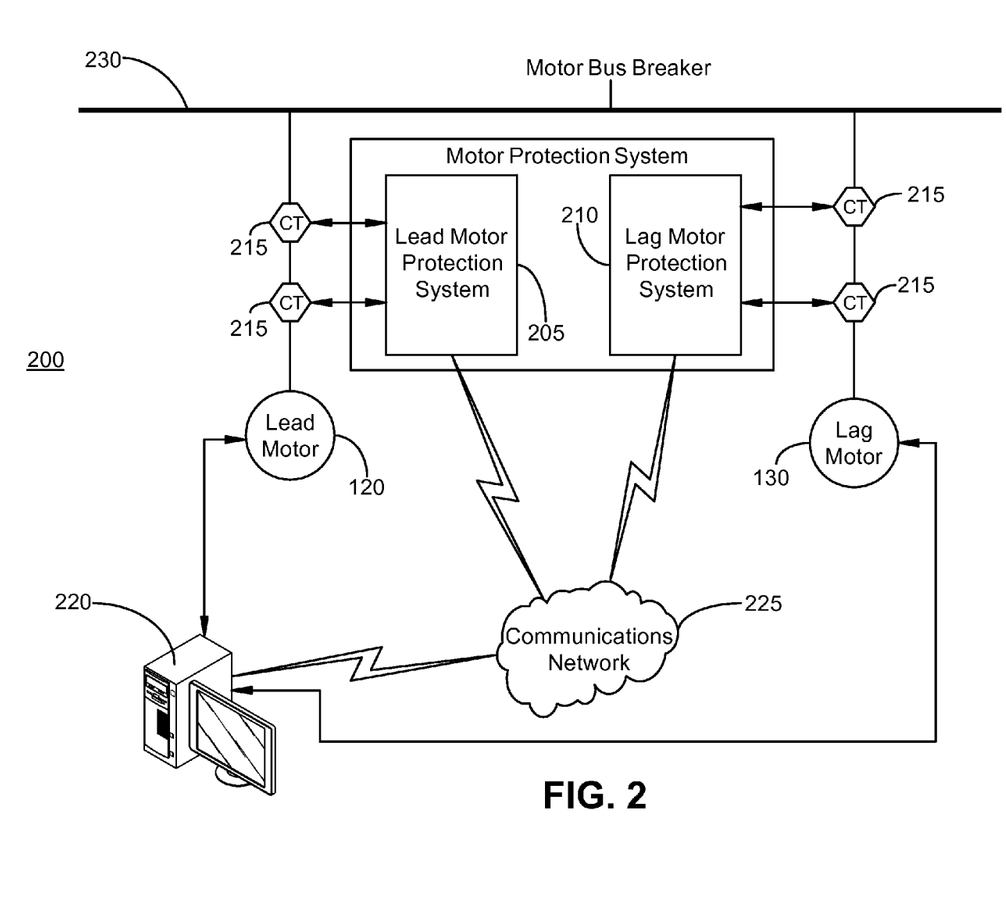
FIG. 2 is a diagram illustrating a system that may be used to monitor and control operation of the redundant motor-driven prime movers depicted in FIG. 1 according to one embodiment of the present invention.

FIG. 2 is a diagram illustrating a system 200 that may be implemented with motor 120 (lead motor) from lead prime mover 105 and motor 130 (lag motor) from lag prime mover 110 to monitor and control operation of the prime movers. As shown in FIG. 2, a motor protection system 205 (lead motor protection system) is coupled to motor 120 and a motor protection system 210 (lag motor protection system) is coupled to motor 130 to provide protection against items that may include unbalanced loads, excessively high overcurrent faults, undervoltage conditions, overvoltage conditions, mechanical jams and load losses. Performing these functions as well as other motor protection functionalities are well known in the art of motor protection devices and therefore a detailed description of these functions is not provided.

Motor protection systems 205 and 210 receive and provide information to current sensors 215 that obtain current measurements from motors 120 and 130. In one embodiment, current sensors 215 may comprise a current transformer (CT), a Hall effect sensor, a LEM current sensor, a shunt, a Rogowski coil and a fiber optic current sensor. In one embodiment, current sensors 215 are configured to generate average phase current readings and ground current readings from motors 120 and 130. For the sake of simplicity in illustrating embodiments of the present invention, those skilled in the art will recognize that not all types of sensors and transducers that may be used to monitor the motors and provide information to the motor protection systems are illustrated in FIG. 2. For example, those skilled in the art will appreciate that motor protection systems 205 and 210 could receive data from sensors that provide phase voltage, differential inputs, and data from the windings and bearings of motors 120 and 130, as well as pumps 115 (FIGS. 1) and 125 (FIG. 1) driven by these motors.

Although FIG. 2 shows the use of a separate motor protection system coupled to each motor (i.e., lead motor and lag motor), it is conceivable that one motor protection system could be used to protect lead motor 120 and lag motor 130. Regardless of the number used, motor protection systems 205 and 210 may be any commercially available motor protection system or device such as an electric meter or relay. One example of a commercially available motor protection device that may be used in system 200 is a 469 Motor Management Relay sold by GE Multilin. Those skilled in the art will recognize that there are other commercially available motor protection devices that perform functions and generate information similar to the 469 Motor Management Relay that can be utilized in the embodiments described herein.

A controller 220 shown in FIG. 2 as a computer is connected to motor protection systems 205 and 210 via a communications network 225 and lead motor 120 and lag motor 130. Although not illustrated in FIG. 2, those skilled in the art would recognize that controller 220 is connected to lead prime mover 105 (FIG. 1) and lag prime mover 110 (FIG. 1), which includes the motor/pump sets of lead motor 120 and pump 115, and lag motor 130 and pump 125. In one embodiment, controller 220 controls operation of lead prime mover 105 (FIG. 1) and lag prime mover 110 (FIG. 1) as a function of the motor protection measurements generated from motor protection systems 205 and 220. In particular, controller 220 uses the motor protection measurements to determine if the lead motor-driven prime mover 105 (FIG. 1) is in distress. As used herein, a motor is in distress if the loads applied to it cause it to run slower than nameplate rating at rated voltage. If controller 220 determines that lead motor-driven prime mover 105 (FIG. 1) is in distress, then it activates operation of lag motor-driven prime mover 110 (FIG. 1). In one embodiment, controller 220 activates operation of the lag motor-driven prime mover 110 (FIG. 1) prior to the tripping of the distressed lead motor-driven prime mover 105 (FIG. 1).

In addition to controlling lead motor 120 and lag motor 130, controller 220 can be used to perform a variety of other operations. For example, controller 220 can be used to perform remote monitoring and diagnostics of the lead motor 120 and lag motor 130, as well as general management of these assets and other assets (e.g., pumps, valves, manifolds, etc.) utilized in the process operation.

Although not shown in FIG. 2, another computer may be located locally about motor protection systems 205 and 210, so that a plant operator can have closer interaction with the systems at the process level. Regardless of where computers are located in the process operation, these computers can be implemented with the various embodiments of the present invention to provide control of lag motor-driven prime mover 110 (FIG. 1) and lead motor-driven prime mover 105.

In operation, power comes to lead motor 120 and lag motor 130 through a motor bus 230 and a motor bus breaker (not illustrated in FIG. 2). Although not shown in FIG. 2, each motor would have motor contactors and protective fuses in the event of a contactor's failure to open. During operation, sensors 215 provide operational data (e.g. average phase current, voltage) from lead motor 120 to motor protection system 205. Motor protection system 205 generates motor protection measurements from the operational data. In one embodiment, the motor protection measurements generated from motor protection system 205 include current unbalance and current overload information. The current unbalance and current overload is provided to controller 220 via communications network 225 which uses this information to determine whether lead prime mover via lead motor 120 is in distress. If in distress, controller 220 activates operation of the lag prime mover via lag motor 130 to start moving fluid.

In one embodiment, controller 220 utilizes a motor protection curve defined for the process operation in which lead prime mover 105 (FIG. 1) driven by lead motor 120 and lag prime mover 110 (FIG. 2) driven by lag motor 130 operate to determine if lead motor is in distress. In addition, controller 220 utilizes the motor protection curve to determine the time in which lag motor 130 can be activated upon determining that lead motor 120 is in distress. In order for controller 220 to perform these functions, the motor protection curve provides a safe run-time for operating the distressed lead motor-driven prime mover 105 (FIG. 1) at an overload current level. In addition, the motor protection curve provides a maximum backup starting time for activating operation of the lag motor-driven prime mover 110 (FIG. 1) prior to the tripping of the distressed lead motor-driven prime mover 105 (FIG. 1).

In one embodiment, the motor protection curve used by controller 220 can be generated from motor curves provided by a motor supplier. A typical set of motor curves for a motor includes curves of torque, power consumption, current and power factor plotted against speed. Generally, the current curve for one of these motor protection curve monotonically decreases from a locked-rotor or zero speed to no-load current at very near synchronous speed. For service factor 1 motors, which are suitable for use in the lubrication supply process operation illustrated in FIG. 1, a motor protection system such as a 469 Motor Management Relay sold by GE Multilin would typically declare a motor start when the motor reaches a near nameplate speed with current less than 115% of rated current. The 115% value has been determined to be the onset of overload for service factor 1 motors.

In addition to motor curves provided by a motor supplier, motor curves specified according to industry standard can be used to derive the motor protection curve used by controller 220. In one embodiment, IEEE Standard 620 motor protection curves used by the ANSI C37.96 Motor Protection Standard can be used to derive the motor protection curve used by controller 220. Typically, these curves are generally semi-logarithmic plots that typically are four decades high on time from 0.1 second to 1000 seconds versus a linear scale in per units (PU) or multiples of motor nameplate or rated current. A typical IEEE Standard 620 motor protection curve used by the ANSI C37.96 Motor Protection Standard goes to 7 PU, covering generally high efficiency motors that have locked-rotor currents at 630% or 6.3 PU.

Figure 3:
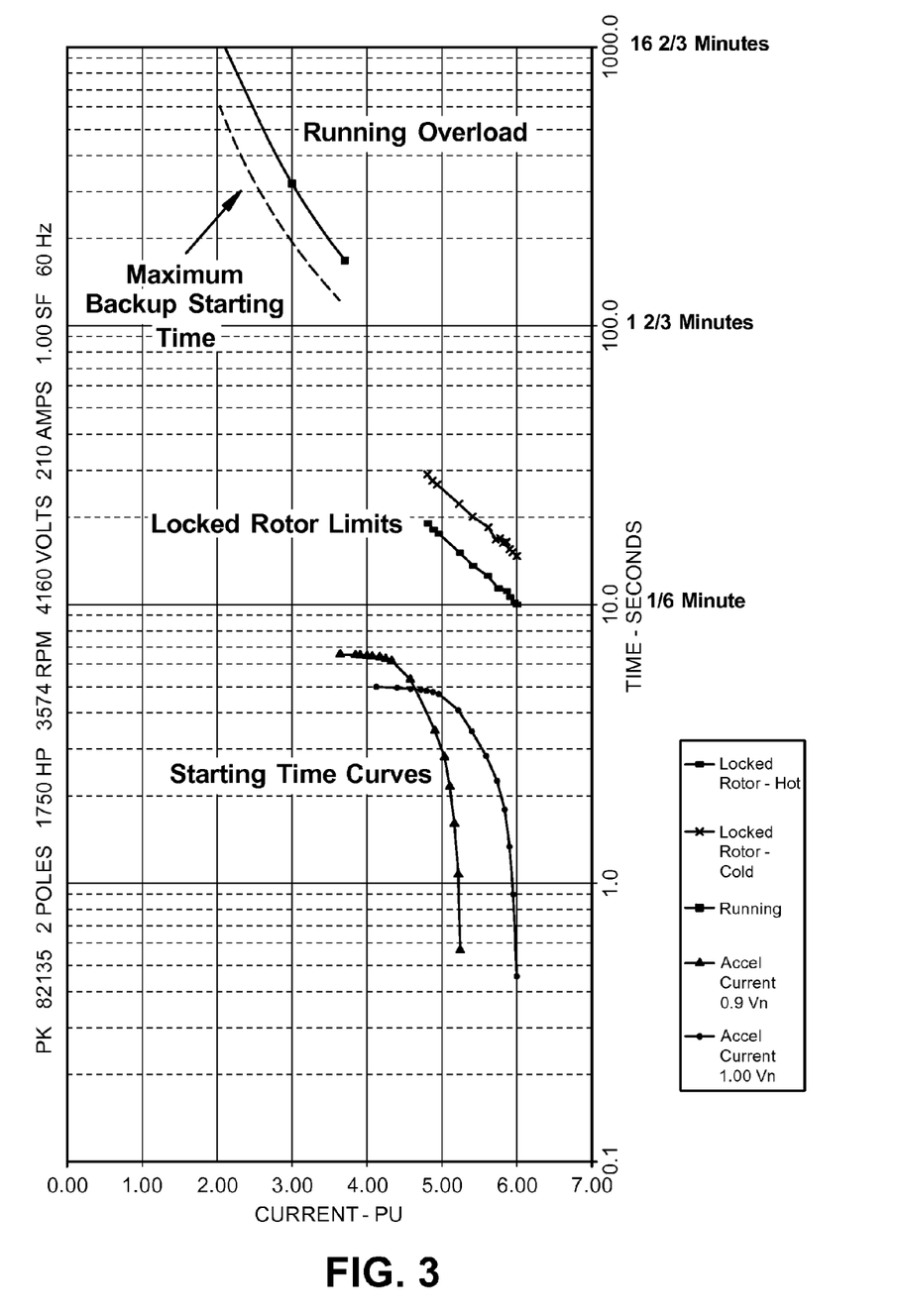
FIG. 3 shows a typical set of motor protection curves for a conventional three-phase motor that may be used to generate a motor protection curve defined for controlling the process in which the redundant motor-driven prime movers depicted in FIG. 1 operate and FIG. 4 is a flow chart describing operations associated with controlling and monitoring the redundant motor-driven prime movers depicted in FIG. 1 with the system depicted in FIG. 2 according to one embodiment of the present invention.

FIG. 3 shows an example of a typical set of IEEE Standard 620 motor protection curve used by the ANSI C37.96 Motor Protection Standard for a conventional three-phase motor that may be used to generate the motor protection curve utilized by controller 220 (FIG. 2). The top curve, labeled "Running Overload", shows the range of maximum safe operating times at current overloads before motor thermal failure. This is intended for situations such as bearing failure, fluid viscosity/impedances changes that would cause the motor to overload and simple mechanical overload. The "Locked-Rotor Limits" are the maximum safe times that the motor can be stalled when at a rotor hot scenario (i.e., recently attempted to start or just stopped running, which is the lower curve with shorter time) and when at a rotor cold scenario. The motor protection curve of FIG. 3 also shows two starting time curves. One of the starting time curves has a slower time at 0.9 PU voltage (90% of nameplate voltage) and the other starting time curve has a faster time at 1.0 PU voltage.

The information provided from the motor curves provided by a motor supplier and the industry standard motor curves (e.g., IEEE Standard 620 motor protection curves used by the ANSI C37.96 Motor Protection Standard) are used to derive the motor protection curve used by controller 220. In particular, this generally involves margining the motor starting time and deducting from the existing Running Overload curve. This results in a new reduced time that can be used to determine when to start lag prime mover 105 via lag motor 130.

Although there are many ways to create the motor protection curve used by controller 220 to control a process operation involving lead and lag prime movers, one example is described with respect to FIG. 3. In particular, to determine a generous safety margin to start a lag motor, consider margining the starting time at the degraded voltage level of 0.9 PU time and then applying a factor of 2 for safety (2×6.5=13 seconds). FIG. 3 indicates that 2 times the 0.9 PU voltage starting time has been subtracted from the time of the highest overload point of (3.7 PU current at 172 seconds) to be 172−13=159 seconds. Parallel shifts of Running Overload curve result from a constant multiplier. As an example, FIG. 3 indicates that the constant multiplier is 159/172=0.9244. Thus the three points defining the curves in FIG. 3 are:

| Original Safe Time Curve (Current, Time) | Maximum Backup Starting Time (Current, Time) |
|---|---|
| (3.70, 172) | (3.70, 159) |
| (3.00, 319) 319 × 0.9244 = 295 | (3.00, 295) |
| (2.11, 1000) 1000 × 0.9244 = 924 | (2.11, 924) |

Another way to construct the motor protection curve would be to simply subtract 13 seconds from the curve at all points. This will give a steeper curve through (3.70, 159) that will almost appear to meet the safe time curve at (2.11, 987). In another embodiment, it is also possible to use lower factors and be more conservative for assuring that the lag motor is safely on-line. Those skilled in the art will appreciate that since the Running Overload line is the maximum safe limit, that any curve drawn below it and to the left is safer. Drawing the line too low is also recognized as inviting nuisance starting of the lag pump if the overloads in the process are not well understood.

A "Maximum Backup Starting Time" curve is a curve that results from any one of these approaches. The Maximum Backup Starting Time curve as shown in FIG. 3 now gives a methodology that does not have pressure loss or flow loss from the time delay from the gradual loss of the lead prime mover to the arriving of the lag motor at running speed.

In order to implement the above-derived protection curve, controller 220 utilizes a timer to ascertain at what time to activate the lag prime mover after determining that a lead prime mover is in distress. In one embodiment, the timer is initiated in response to the motor protection system determining that the lead motor-driven prime mover has an overload current value that is greater than a predetermined overload current value set forth in the derived motor protection curve. In one embodiment, controller 220 activates operation of the lag motor-driven prime mover in response to the timer exceeding a predetermined time limit specified for the overload current value in the motor protection curve. In addition, controller 220 records the present overload current value for the lead motor-driven prime mover that initiated the activation of the lag motor-driven prime mover. Also, in this embodiment, controller 220 may generate a notification to the plant operator that a transfer of movement from the lead motor-driven prime mover to the lag motor-driven prime mover has occurred.

After transfer has been made to the lag prime mover 110 (FIG. 1), both motor/pump sets from lead prime mover 105 (FIG. 1) and lag prime mover 110 are running. In one embodiment, at the point where the troubled motor is about to be taken off-line, controller 220 compares the recorded overload current to a current value obtained from the lag motor-driven prime mover to determine if it is within a predetermined acceptable level. In one embodiment, if the difference is +/−5% to +/−10% of the high current level of the motor taken off line, then controller 220 generates a process status notification (e.g., an alarm) to the plant operator that a new prime mover did not solve the problem and it is likely that there is some other problem (e.g., hydraulic, pneumatic, etc.) in the process that is causing the problem as opposed to the motors which are operating normally. Note that in this embodiment, it is preferable to take the reading from the motor of the lead prime mover before the lag motor-driven prime mover is started. It is also preferable to take the reading from the motor of the lag prime mover after the lead motor-driven prime mover is shut down.

If it turns out that the overload current value for the lead motor-driven prime mover 105 (FIG. 1) has dropped below the predetermined overload current value (which triggered the initiation of the timer) before a predetermined time limit specified for the present overload current value (as specified in the derived motor protection curve) has expired, then controller 220 maintains usage of the lead motor-driven prime mover 105 (FIG. 1) to move the fluid. In this embodiment, controller 220 may generate a motor status notification to the plant operator that the overload current has cleared. Also, controller 220 may reset the timer in response to determining that the overload current value for the lead motor-driven prime mover 105 (FIG. 1) has dropped below the predetermined overload current value before the predetermined time limit specified for the present overload current value has been met or expired.

Those skilled in the art will appreciate that the various notifications to the plant operator described above can be made through one of many different mediums used for reporting information. For example, notification can comprise an alarm, an electronic mail, or a report that provides various details of the events that have occurred during the process operation. These are only a non-exhaustive listing of possible forms of notification that may be used, however, embodiments of the present invention are not limited to any particular form of notification.

In various embodiments of the present invention, portions of the control actions performed by controller 220 can be implemented in the form of an entirely hardware embodiment, an entirely software embodiment or an embodiment containing both hardware and software elements. In one embodiment, the processing functions performed controller 220 may be implemented in software, which includes but is not limited to firmware, resident software, microcode, etc.

Furthermore, the processing functions performed by controller 220 can take the form of a computer program product accessible from a computer-usable or computer-readable medium providing program code for use by or in connection with a computer or any instruction execution system (e.g., processing units). For the purposes of this description, a computer-usable or computer readable medium can be any computer readable storage medium that can contain or store the program for use by or in connection with the computer or instruction execution system.

The computer readable medium can be an electronic, magnetic, optical, electromagnetic, infrared, or semiconductor system (or apparatus or device). Examples of a computer-readable medium include a semiconductor or solid state memory, a random access memory (RAM), a read-only memory (ROM), a rigid magnetic disk and an optical disk. Current examples of optical disks include a compact disk-read only memory (CD-ROM), a compact disk-read/write (CD-R/W) and a digital video disc (DVD)

Figure 4:
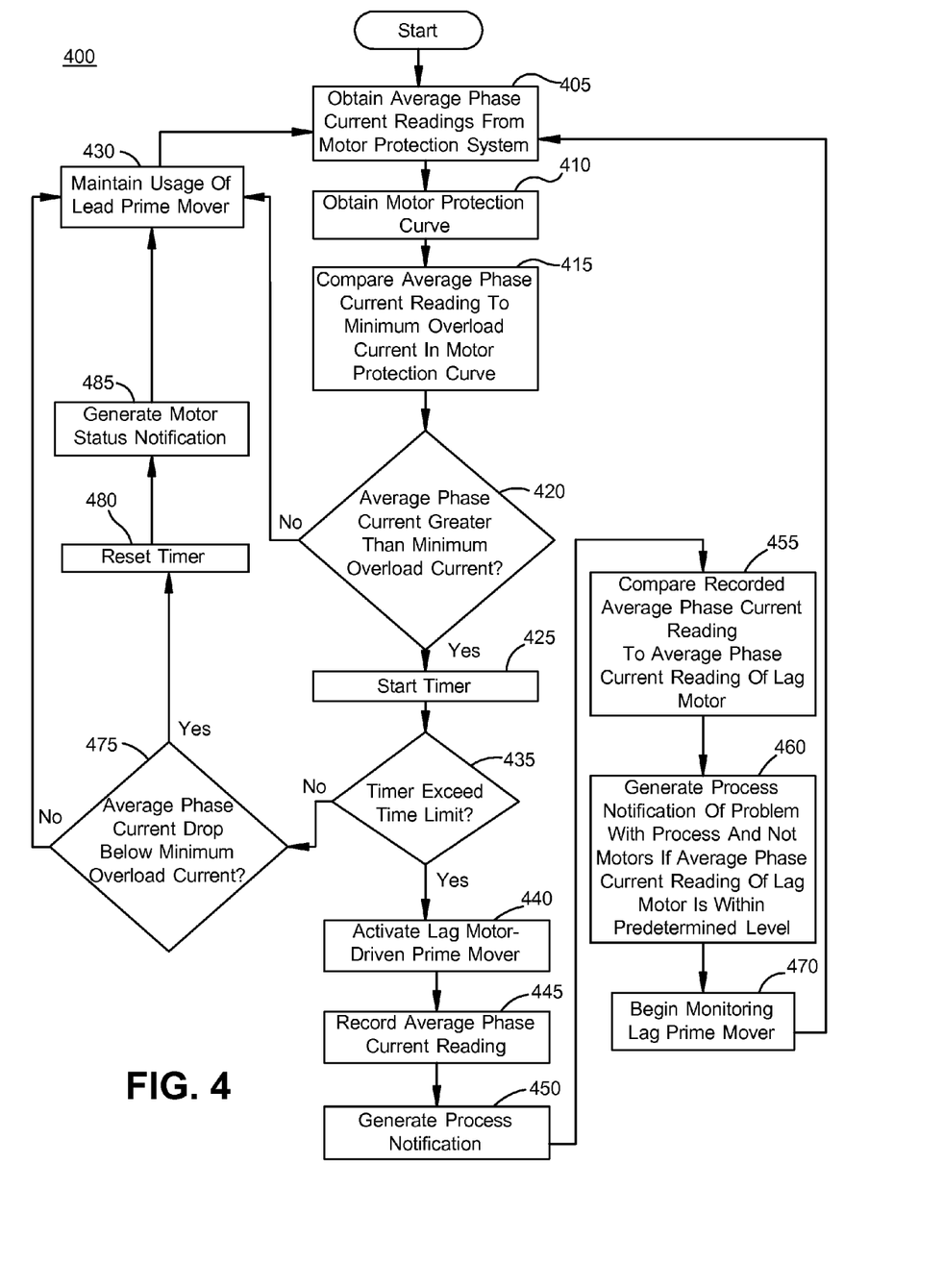

FIG. 4 is a flow chart 400 describing operations associated with controlling and monitoring lead prime mover 105 and lag prime mover 110 depicted in FIG. 1 with the system depicted in FIG. 2 according to one embodiment of the present invention. In flow chart 400 of FIG. 4, controller 220 obtains motor protection measurements from motor protection system 205 at 405. In particular, controller 220 obtains average phase current readings. In addition to average phase current readings, controller may obtain other motor protection measurements pertinent to the operation of lead motor 120 such as current unbalance and current overload information. In one embodiment, controller 220 can obtain the motor protection measurements from motor protection system 205 and operational data from sensor 215 by any one of currently available electronic communications systems such as Modbus, Prophibus, CanBus, Foundation Field Bus, High Speed Ethernet, etc.

At 410, controller 220 obtains the motor protection curve for lead motor 120 that has been derived specifically for the process operation in which lead prime mover 105 functions. As mentioned above, the motor protection curve is utilized to determine if lead motor 120 is in distress.

In one embodiment, controller 220 determines if lead motor 120 is in distress at 415 by comparing the average phase current readings to a minimum overload current specified in the motor protection curve. If it is determined at 420 that the average phase current reading is greater than the minimum overload current specified in the motor protection curve, then controller initiates the timer. If the average phase current reading is not greater than the minimum overload current, then the process operation maintains usage of lead prime mover at 430 and monitoring of it continues in accordance with blocks 405-420.

After the timer has been initiated, a determination is made at 435 to ascertain whether a predetermined time limit specified for the overload current value in the motor protection curve has been exceeded. If the time limit has been exceeded, then controller 220 activates operation of the lag motor-driven prime mover 110 at 440 and records the present overload current value that initiated the activation of the lag motor-driven prime mover at 445. Also, controller 220 generates a notification at 450 to notify the plant operator that a transfer of movement from the lead motor-driven prime mover to the lag motor-driven prime mover has occurred.

At the point where lead motor 120 is about to be taken off-line, controller 220 compares the recorded overload current to a current value obtained from lag motor 130 of lag motor-driven prime mover 110 at 455 to determine if it is within a predetermined acceptable level. In one embodiment, if the difference is +/−5% to +/−10% of the high current level of the motor taken off line (i.e., lead motor 120), then controller 220 generates a process status notification (e.g., an alarm) at 460 to the plant operator that a new prime mover did not solve the problem and it is likely there is some other problem in the process that is not associated with the motor. In one embodiment, the lag motor 130 would start to be monitored at 470 and the above-noted functions would be repeated. In the meantime, the plant operator can determine the underlying issue in the process operation.

If it is determined at 435 that the time limit has not been exceeded and that the overload current value for lead motor 120 has dropped below the predetermined overload current value which triggered the initiation of the timer as determined at 475, then controller 220 maintains usage of the lead motor-driven prime mover. In particular, controller 220 resets the timer at 480 and generates a motor status notification to the plant operator at 485 that indicates that the overload current has cleared. If it is determined at 475 that the overload current value for lead motor 120 has not dropped below the predetermined overload current value and that the time limit has not been exceeded at 435, then controller 220 continues to monitor the average current reading for lead motor 120 until it is determined that the time limit has expired.

The foregoing flow chart of FIG. 4 shows some of the processing functions associated with using controller 220 to monitor and control lead prime mover 105 and lag prime mover 110. In this regard, each block represents a process act associated with performing these functions. It should also be noted that in some alternative implementations, the acts noted in the blocks may occur out of the order noted in the figure or, for example, may in fact be executed substantially concurrently or in the reverse order, depending upon the act involved. Also, one of ordinary skill in the art will recognize that additional blocks that describe the processing functions may be added.

While the disclosure has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the disclosure.

What is claimed is:
1. A system, comprising:
at least two redundant motor-driven prime movers, wherein one of the at least two redundant motor-driven prime movers comprises a lead motor-driven prime mover and a second of the at least two redundant motor-driven prime movers comprises a lag motor-driven prime mover that operates in response to the lead motor-driven prime mover being in distress;
a plurality of sensors, coupled to the at least two redundant motor-driven prime movers, that measure operational data associated with the at least two redundant motor-driven prime movers;
a motor protection system, coupled to the plurality of sensors, that generates a plurality of motor protection measurements from the operational data measured by the plurality of sensors; and
a controller, coupled to the at least two redundant motor-driven prime movers and the motor protection system, that controls operation of the at least two redundant motor-driven prime movers as a function of the plurality of motor protection measurements, wherein the controller uses the plurality of motor protection measurements to determine if the lead motor-driven prime mover is in distress, the controller activating operation of the lag motor-driven prime mover in response to determining that the lead motor-driven prime mover is in distress, wherein the controller activates operation of the lag motor-driven prime mover prior to tripping the distressed lead motor-driven prime mover.

2. The system according to claim 1, wherein the controller utilizes a motor protection curve defined for a process in which the at least two redundant motor-driven prime movers operate.

3. The system according to claim 2, wherein the motor protection curve provides a safe run-time for operating the distressed lead motor-driven prime mover at an overload current level.

4. The system according to claim 2, wherein the motor protection curve provides a maximum backup starting time for activating operation of the lag motor-driven prime mover prior to the tripping of the distressed lead motor-driven prime mover.

5. The system according to claim 1, wherein the operational data measured by the plurality of sensors comprises average phase current.

6. The system according to claim 1, wherein the plurality of sensors comprise a current transformer, a Hall effect sensor, a current sensor, a shunt, a Rogowski coil and a fiber optic current sensor.

7. The system according to claim 1, wherein the plurality of motor protection measurements generated by the motor protection system comprises current unbalance and current overload.

8. The system according to claim 1, wherein the motor protection system comprises a lead motor protection device coupled to the lead motor-driven prime mover and a lag motor protection device coupled to the lag motor-driven prime mover.

9. The system according to claim 1, wherein the controller comprises a timer.

10. The system according to claim 9, wherein the timer is initiated in response to the motor protection system determining that the lead motor-driven prime mover has an overload current value greater than a predetermined overload current value.

11. The system according to claim 10, wherein the controller activates operation of the lag motor-driven prime mover in response to the timer exceeding a predetermined time limit specified for the overload current value.

12. The system according to claim 11, wherein the controller records the overload current value for the lead motor-driven prime mover that initiated the activation of the lag motor-driven prime mover.

13. The system according to claim 12, wherein the controller compares the recorded overload current to a current value obtained from the lag motor-driven prime mover upon taking the lead motor-driven prime mover off-line.

14. The system according to claim 13, wherein the controller generates a process status notification that a problem exists in a process in which the at least two redundant motor-driven prime movers operate and that operation of the motor-driven prime movers is normal, the controller generating the process status notification in response to determining that the current level for the lag motor-driven prime mover is within a predetermined acceptable level of the recorded overload current for the lead motor-driven prime mover.

15. The system according to claim 11, wherein the controller generates a notification that a transfer of movement from the lead motor-driven prime mover to the lag motor-driven prime mover has occurred.

16. The system according to claim 10, wherein the controller maintains usage of the lead motor-driven prime mover in response to determining that the overload current value for the lead motor-driven prime mover has dropped below the predetermined overload current value before a predetermined time limit specified for the present overload current value has been met.

17. The system according to claim 16, wherein the controller generates a motor status notification that the overload current has cleared.

18. The system according to claim 16, wherein the controller resets the timer in response to determining that the overload current value for the lead motor-driven prime mover has dropped below the predetermined overload current value before the predetermined time limit specified for the present overload current value has been met.

19. The system according to claim 9, wherein the timer comprises a dedicated timer for each of the at least two redundant motor-driven prime movers.

20. A prime mover system that moves a fluid, comprising:
a lead prime mover driven by a first motor that moves the fluid;
a lag prime mover driven by a second motor that moves the fluid in response to the first motor being in distress;
a plurality of sensors that measure operational data associated with the first motor of the lead prime mover and the second motor of the lag prime mover;
a first motor protection system that generates a plurality of motor protection measurements from the operational data associated with the first motor;
a second motor protection system that generates a plurality of motor protection measurements from the operational data associated with the second motor; and
a controller that controls operation of the lead prime mover and the lag prime mover as a function of the plurality of motor protection measurements generated by the first motor protection system and the second motor protection system, wherein the controller uses the plurality of motor protection measurements to determine if the lead prime mover is in distress, the controller activating operation of the lag prime mover in response to determining that the lead prime mover is in distress, wherein the controller activates operation of the lag prime mover prior to tripping the distressed lead prime mover, wherein the controller utilizes a motor protection curve defined for a process in which the lead prime mover and lag prime mover are used to guide operation of the prime movers, the motor protection curve providing a safe run-time for operating the distressed lead prime mover at an overload current level and a maximum backup starting time for activating operation of the lag prime mover prior to the tripping of the distressed lead prime mover.

* * * * *